Patented Mar. 29, 1927.

1,622,396

UNITED STATES PATENT OFFICE.

ALEXANDER T. SCHENCK, OF SEATTLE, WASHINGTON.

PROCESS OF PRODUCING A POROUS CEMENTITIOUS ARTICLE.

No Drawing.    Application filed January 4, 1926. Serial No. 79,265.

This invention relates to a process in the producing of cement and cementitious products whereby the material is so handled and treated during the mixing and molding of the particular article that the resultant product is of extremely light weight for the cubical contents as compared with the weight of the ordinary cement mixture when producing a similar product.

In cementitious products as heretofore produced the material has been close grained and impervious to air and moisture and where lightness or dead air spaces were desired such have been specifically molded into the article.

The process of the present invention is to provide the cementitious product with a relatively large number of internal air cells or spaces of appreciable size whereby to not only lighten the product but to render the same in effect substantially similar to the usual hollow blocks used for example largely in building purposes. As distinguished from the prior process wherein such air spaces are specifically molded into the article, the present process aims to secure this result by the generation of a gas during the mixing of the cement which gas in its attempt to reach the surface of the article forms a large number of air cells or spaces with the effect to materially lighten the product and at the same time form the requisite hollow air spaces in the interior of the product.

In carrying out the process the cementitious material, preferably in granulated form, is mixed with an acidulous element and a metallic element with the latter of the nature to be attacked by the former for the generation of gas. After being appropriately mixed, during which the gas is liberated, the mixture is placed in appropriate molds and allowed to harden. A rather important step in connection with the process is that employed to maintain more or less uniformity in the size of the spaces within the article due to the gas bubbles. It has been found in practice that if permitted to stand quiescent, the size of the gas bubbles will naturally increase toward the surface of the block incident to the decreasing pressure of the mass, and that, assuming it desirable to have these air voids of substantially uniform size throughout the block, it has been found of importance to gradually turn the block or mass of molded material during the setting operation, this at once compels a more or less uniformity in the size of the gas bubbles and thus the voids in the mass are substantially the same size throughout the mass.

In carrying out the process and with specific relation to a given instance 100 pounds by weight of Portland cement is mixed with 864 cubic inches of sand, 6 cubic inches of hydrated lime, and 2½ cubic inches of aluminum. Approximately 7 gallons of water are added and the mass thoroughly mixed. The lime acting upon the aluminum liberates a gas in large quantities so that the mixed mass is in a process of ebullition. While in this state the mass is poured into the desired molds. If allowed to set under these conditions the mass when set will be found to contain a large number of air spaces distributed irregularly throughout the mass, but peculiar in that they are of smallest size at the center of the mass and of gradually increasing size toward the surface of the mass. If it be desired, as is generally the case, that these air chambers be of substantially uniform size throughout the mass it is necessary to gradually turn or reverse the mass during the setting operation. This can be accomplished in any manner, either by hand or mechanically, and when carried out will be found to insure a distribution of the gas bubbles throughout the mass of more or less uniform diameter. Of course under these circumstances, the mass may be turned in any desired direction as for example, continuously on its longitudinal axis to thereby insure a uniformity in the voids provided by the gas bubbles.

While the process can be efficiently carried out with the use of cold water, and may readily be varied in the use of new gas liberating materials which will not deleteriously affect the final product, it has been found that the use of warm water, say at about 150 degrees F. will materially accelerate the action and insure a greater volume of gas in the same period of time as compared with cold water. Therefore where an ordinary porous mass is to be produced, cold water may be used, while if an unusual or high degree of porosity in the mass is required, warm water will be found more effective. Furthermore, with the use of warm water and consequent increased gas liberation, the mass should be placed in the molds in a shorter time after mixing than is necessary with the use of cold water.

The process provides merely throughout the mixing of the appropriate ingredients and the gradual reversing of the mass during setting a comparatively light highly porous cementitious product, which is adapted for all uses in which the usual hollow cement structures are used, the products having the advantage that they be readily divided into desired forms without the labor incident to the chiseling of the conventional cementitious product, as is now required.

I claim:

The process of producing a porous cementitious article consisting in mixing cement in granulated form, hydrated lime, aluminum and warm water, molding the article during the gas liberation, securing the article within the mold and rotating the mold during the setting operation to compel formation of substantial uniform voids in the mass to the gas passage therethrough.

In testimony whereof I affix my signature.

ALEXANDER T. SCHENCK.